Nov. 23, 1948.
J. M. ROBERTS
2,454,671
ELECTRIC MOTOR CONTROL
Filed May 20, 1943
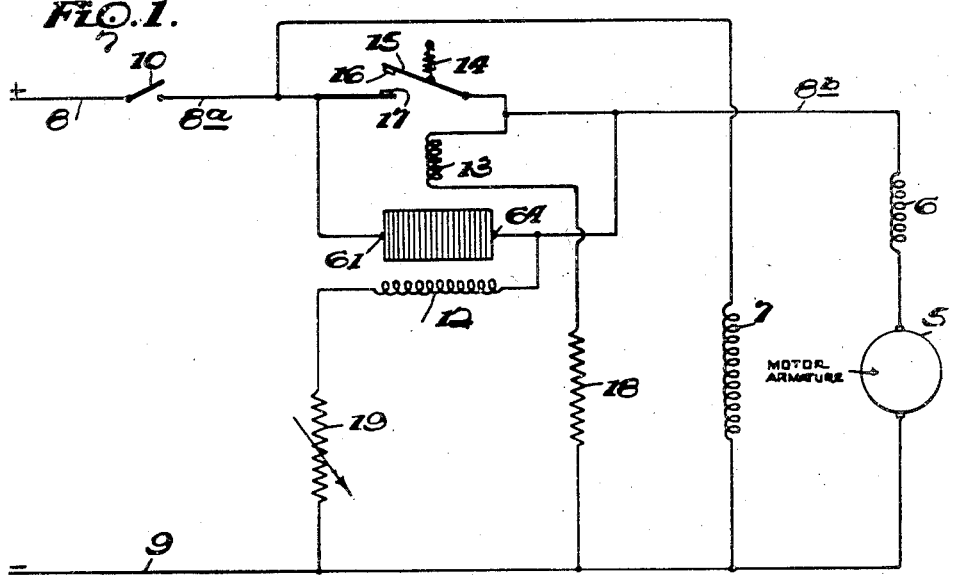
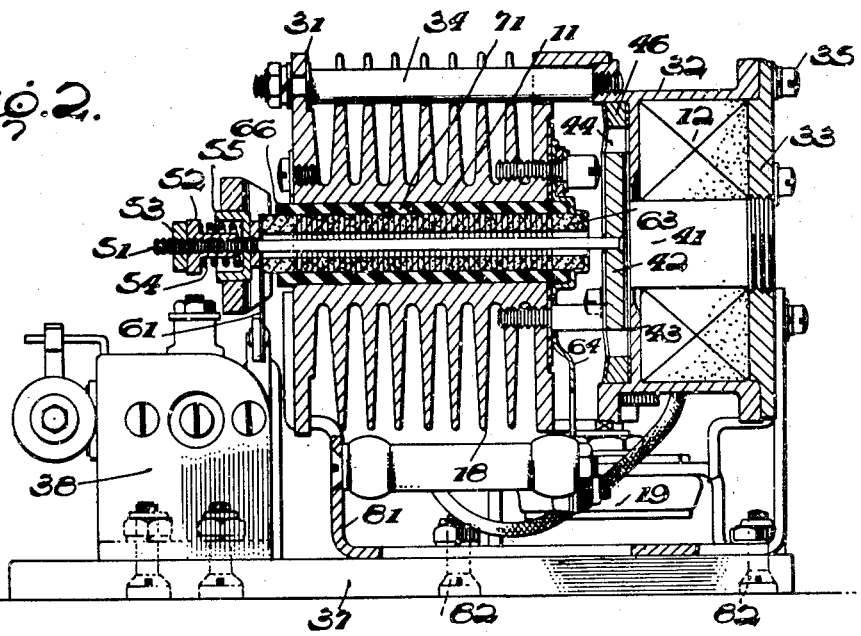
INVENTOR.
Jean M. Roberts.
BY
Martin J. Finnegan
ATTORNEY Patented Nov. 23, 1948

2,454,671

UNITED STATES PATENT OFFICE 2,454,671

ELECTRIC MOTOR CONTROL

Jean M. Roberts, Ridgewood, N. J., assignor to Bendix Aviation Corporation, Bendix, N. J., a corporation of Delaware Application May 20, 1943, Serial No. 487,783

4 Claims. (Cl. 318—278)

This invention relates to electrical apparatus, and particularly to the starting of electric motors.

An object of the invention is to provide a motor starting means and method by which the electrical and mechanical shocks and strains that usually attend the starting of a motor are substantially reduced.

Another object is to provide automatically operating electrical means for controlling the current and voltage characteristics of a motor circuit during the starting interval.

In the starting of electric motors it is common practice to employ a manually operable resistance unit in order to control the electrical input to the motor following closure of the circuit leading from the source of power, and while this method of control is satisfactory in certain motor applications, as for example in locations where there is a person available for manual control of the operation, there are other installations wherein it is not practical to rely on manual operation of a starting resistance unit. A disadvantage of manual control is that the rate at which the resistance is cut out depends upon the judgment of the operator. Also, in the operation of motors on aircraft and other vehicles, the person operating the vehicle has too many other duties and therefore can not be depended upon to supervise the insertion and removal of resistance in the motor circuit during the starting operation. Because of this problem, motor vehicle installations of motors have commonly been made in such manner as to have no special control whatever over the input of power to the motor beyond the single operation of closing the power circuit. Such practice is, of course, objectionable for the larger motors now being developed because of the severe mechanical strain resulting from the application of full line voltage to a motor which is at rest, and the resulting current surges and voltage fluctuations in the circuit are decidedly injurious to the equipment and disturbing to other electrical apparatus connected to the circuit. The present invention provides means and methods for meeting this problem by the use of automatically operating electrical apparatus to provide substantially complete and smoothly regulated control of the power input to the motor.

These and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

In the drawing:

Fig. 1 is a schematic representation of the invention as applied to the starting of a direct current, compound-wound motor; and Fig. 2 is a longitudinal sectional view of the variable resistance unit shown diagrammatically in Fig. 1.

Referring first to Fig. 1, the motor armature is indicated diagrammatically at 5, the motor series field at 6, the shunt field at 7, the supply lines at 8, 8a, 8b and 9, and the line circuit breaker or switch at 10. Reference character 11 designates a variable resistance unit of the carbon-pile type; and 8b indicates the line connecting the resistance unit to the motor series field and armature circuit. At 12 is shown the winding of a solenoid which is adapted to operate upon the carbon pile 11 to increase the pressure upon the individual discs of the carbon pile as the voltage applied to the said winding 12 is increased; the mechanical arrangement by which this is accomplished being shown more clearly in Fig. 2. Reference character 13 designates the winding of a relay which in conjunction with a spring 14 controls the operation of a switch element 15 carrying a contact 16 adapted to engage a stationary contact 17. A fixed resistance unit is shown at 18 as being in series with the relay winding 13 (both being connected across the lines 8—8b—9) and a rheostat 19 is inserted between the winding 12 and the return feed 9.

As shown in Fig. 2 the members 11 and 12 of Fig. 1 are combined in an assembly of housing elements 31, 32 and 33 held together by studs 34 and screws 35; the studs being effective to secure the finned pile retaining member 31 to the coil housing member 32, and the coil housing member 32 being flanged to receive the screws 35 by which the end plate 33 is attached. The elements 31, 32 and 33 are all mounted on base 37, as is also the plate 38 which receives the relay parts 13, 14, 15, 16 and 17 of Fig. 1.

The magnetic circuit of coil 12 includes fixed core 41, movable armature 42, and circular flange 43 of housing section 32; the armature 42 also carrying leaf springs 44 resting on annular abutment 46 (as in Newton Patent No. 2,268,718). A rod 51 is attached at one end to armature 42, and its opposite end receives a threaded sleeve 52, a nut 53, a spring 54, a cup 55, and a thrust washer 56 of insulating material to transmit to the pile 11 the thrust of rod 51 which is induced by the pull of the magnetic circuit upon the armature 42 which carries said rod 51. Pile end washer 62 is engaged by terminal strip 61, and the opposite end washer 63 is engaged by terminal strip 64; the said strips 61 and 64 being connected into the circuit as indicated in Fig. 1. A sleeve 71 of insulating material fits into the central bore in the finned housing member 31, and said sleeve receives the carbon discs constituting the resistor 11. Resistor 18 is mounted to bracket 81, and the latter is secured to base 37, as shown at 82, 82.

With the foregoing arrangement of parts it will be apparent that the resistance value of the carbon pile 11 is a maximum at the instant of initial closure of the line switch 10 and therefore the voltage applicable to the motor windings 5 and 6 will at first be a minimum and will increase only as the armature is accelerated by the force developed by the interaction of the armature current and the magnetic flux set up by the exciting action of the current flowing through the series field 6 and the shunt field 7. As the motor eccelerates, the "counter electromotive force" generated in the armature increases, thus increasing the voltage applied to the solenoid 12 and the relay winding 13. There is a corresponding reduction in the voltage drop across the carbon pile 11 as the pile resistance decreases because of the increase in pressure on the carbon discs, until eventually the reduction in the carbon pile voltage increases the voltage across the relay winding 13 to an extent sufficient to cause a closing of the contacts 16 and 17; such closing occurring at approximately the moment when the motor voltage is approaching perhaps 90% of its normal value, or to the point at which the carbon pile may be considered as having performed its task. The pile is short-circuited by such closure of the contacts 16 and 17. If desired, the member 15 can be provided with an additional set of contacts for the purpose of physically disconnecting the carbon pile solenoid 12 from the circuit after the contacts 16 and 17 have engaged; but whether disconnected or not, the solenoid 12 will, of course, cease to be a significant factor in the circuit after the contacts 16 and 17 have become engaged.

As an alternative arrangement the same solenoid 12 which exerts pressure upon the carbon pile might also be caused to close the contacts 16 and 17, in which case the relay coil 13 and resistor 18 could be eliminated.

To stop the motor it is merely necessary to open the line switch or circuit breaker 10, after which the relay element 15 and armature 42 (with associated moving parts) automatically return to their original positions as the motor comes to rest and are then ready for the next starting operation.

In order to apply the invention to the starting of a shunt-wound motor the series field 6 would be omitted from Fig. 1; and for starting a series-wound motor the shunt field 7 would be omitted (from Fig. 1).

What is claimed is:

1. In combination with a motor armature and a source of current, means for inserting in series with said armature a continuously varying resistance of the class including a variable resistance carbon pile connected in series with the motor armature, a first member fixedly mounted at one end of said carbon pile, a second member adjustably bearing upon the opposite end of said carbon pile, an electromagnet connected across the motor armature circuit, an armature for said electromagnet, and a spring opposing movement of the last mentioned armature by the electromagnet; the improvement comprising a rod extending through said carbon pile and movably mounted therein, one end of said rod affixed to said armature adjacent said first member, a second spring positioned between the opposite end of the rod and said second member for applying an initial compressive force to said carbon pile which force increases with the electromagnetic force applied to said armature by the electromagnet so as to progressively decrease the resistance of said carbon pile.

2. In combination with a motor armature and a source of current, means for inserting in series with said armature a continuously varying resistance of the class including a variable resistance carbon pile connected in series with the motor armature, a first member fixedly mounted at one end of said carbon pile, a second member adjustably bearing upon the opposite end of said carbon pile, an electromagnet connected across the motor armature circuit, an armature for said electromagnet, and a spring opposing movement of the last mentioned armature by the electromagnet; the improvement comprising a rod extending through said carbon pile and movably mounted therein, one end of said rod affixed to said armature adjacent said first member, a second spring positioned between the opposite end of the rod and said second member for applying an initial compressive force to said carbon pile which compressive force increases with the electromagnetic force applied to said armature by the electromagnet so as to progressively decrease the resistance of said carbon pile, and means for adjusting said second spring so as to vary the initial pressure applied to said carbon pile and accordingly the resistance in said motor armature circuit upon initial energization.

3. A device of the character described, comprising, in combination, a variable resistance carbon pile, a first member fixedly mounted at one end of said carbon pile, a second member adjustably bearing upon the opposite end of said carbon pile, an electromagnet, an armature positioned between the fixed end of said carbon pile and said electromagnet and movable in response to said electromagnet, a spring opposing the movement of said armature by the electromagnet, a rod extending longitudinally through said carbon pile and freely mounted therein, said rod connected at one end to said armature, and resilient means connecting the opposite end of said rod to the adjustable second member in such a manner as to effect a decrease in the resistance of the carbon pile in response to energization of the electromagnet.

4. A device of the character described, comprising, in combination, a variable resistance carbon pile, a first member fixedly mounted at one end of said carbon pile, a second member adjustably bearing upon the opposite end of said carbon pile, an electromagnet, an armature movable in response to said electromagnet, a spring positioning said armature between the fixed end of said carbon pile and said electromagnet and opposing the movement of said armature by the electromagnet, a rod extending longitudinally through said carbon pile and freely mounted therein, said rod connected at one end to said armature, a second spring connecting the opposite end of said rod to the adjustable second member, and means for adjusting the second spring for varying the initial setting of said carbon pile and the electromagnetic force initially required to effect a decrease in the resistance of the carbon pile.

JEAN M. ROBERTS.

REFERENCES CITED

The following references are of record in the file of this patent:

UNITED STATES PATENTS

| Number | Name | Date |
|---|---|---|
| 875,663 | James | Dec. 31, 1907 |
| 1,201,255 | Clark | Oct. 17, 1910 |
| 1,361,675 | Bradley | Dec. 7, 1920 |
| 1,468,007 | Doman | Sept. 18, 1923 |
| 1,971,747 | Fletcher | Aug. 28, 1934 |
| 2,268,718 | Newton | Jan. 6, 1942 |
| 2,351,101 | Brelsford | June 13, 1944 |